UNITED STATES PATENT OFFICE.

HERMAN L. HARTENSTEIN, OF CONSTANTINE, MICHIGAN, ASSIGNOR, BY MESNE ASSIGNMENTS, TO CONTINENTAL INVESTMENT COMPANY, OF DULUTH, MINNESOTA, A CORPORATION OF MINNESOTA.

CARBID AND METHOD OF MANUFACTURING SAME.

938,581.      Specification of Letters Patent.      Patented Nov. 2, 1909.

No Drawing. Application filed February 23, 1907, Serial No. 358,922. Renewed August 20, 1909. Serial No. 513,890.

*To all whom it may concern:*

Be it known that I, HERMAN L. HARTENSTEIN, a citizen of the United States, residing at Constantine, in the county of St. Joseph and State of Michigan, have invented certain new and useful Improvements in Carbid and the Method of Manufacturing the Same, of which the following is a full, clear, and exact specification.

This invention relates to carbid and methods of manufacturing the same; and it comprises a fine-grained substantially chemically and physically homogeneous body of calcium carbid, substantially free from blowholes, segregation, and pronounced crystallization; and it also comprises a method of producing such carbid wherein a body of molten carbid is homogenized by being cooled and solidified under conditions precluding the development of pronounced crystallization or chemical or physical segregation; all as more fully hereinafter set forth and as claimed.

In the usual methods of producing calcium carbid, relatively large masses or bodies of molten carbid are allowed to cool and solidify naturally, either in the carbid furnace, or in ingot molds. Carbid being a relatively poor conductor of heat, the exterior solidifies and becomes rigid while the interior is still molten or plastic. In the slow chilling of the interior an opportunity is afforded for crystallization and segregation as well as for interior shrinkage and liberation of gas, with attendant piping, blowholes and cavities. As a result, such blocks or ingots of carbid are far from being homogeneous, either physically or chemically, exhibiting parts or portions of widely differing character. Pronounced crystallization takes place interiorly, together with segregation. The exterior layers are much harder than the interior layers and at the same time yield less acetylene with water. In the usual block or body of carbid, there is always a central cavity and the carbid surrounding this is softer and purer and richer in gas evolving power.

In making the commercial granulated carbid for use in acetylene generators, the block carbid is crushed or disintegrated and the fragments are sized by sieves, etc. to produce the various grades of granulated carbid. Because of the hard, flinty character of parts of the mass, great power must be exerted and heavy machinery used, and in the crushing an abnormal amount of dust or "fines" is formed, this dust coming largely from the interior, richer and softer parts. The dust is of little use commercially since it deteriorates rapidly, exposing a large surface to air and moisture. Considerable deterioration usually results even in the brief exposure in crushing and packaging. For this reason, and others, the commercial acetylene generators are usually constructed to use only lump carbid. The fines are, therefore, a waste product of the carbid factory for which but little use or applicability has been hitherto found. Yet since, as stated, the fines come from the potentially richest portion of the mass, the loss in grade and value in the carbid marketed is greater than corresponds to the sheer percentage of the fines produced.

In the present invention the noted disadvantages are obviated and a richer and better article of carbid is produced, the granulated marketable carbid representing all portions of the mass with substantial uniformity instead of coming largely from the poorer portions thereof, as in the present practice.

In carrying out the invention, the molten carbid is produced in the ordinary manner from the usual reacting mixture of calcareous and carbonaceous matter. The particular manner of production and the particular composition of the carbid produced are not material for the present purposes. However produced, the fused and highly heated molten carbid in the furnace is tapped and allowed to flow into an ingot mold or other receptacle, the particular character of this mold also being of subordinate importance for the present purposes. While the liquid carbid is entering the mold or receptacle, the liquid therein is stirred, agitated or rabbled, the speed of the inflowing stream of molten carbid being so regulated that the quantity in the mold or receptacle is increased gradually. Or the flow into the mold or receptacle may be intermittent, one portion being thoroughly stirred, rabbled or agitated and partially cooled before another is admitted. On the addition of the new portion, it, in turn, is thoroughly stirred or agitated until it is partially cooled and is thoroughly commingled or mixed with the previously admitted quantity. The advanced cooling of the first portion of course contributes to the cooling of the next admitted and permits quicker work. The ingot or block of carbid is thus built up by repeated additions of molten material and no one portion is allowed to stand in a molten but quiet state for a sufficient length of time to permit any substantial crystallization or segregation, such as is practically inevitable when the superheated molten material from the furnace is introduced as a body into a mold where it is given a superficial chill, producing a rigid shell within which the mass remains molten and plastic for an indefinite period.

In the described method of operation, the cooling is brought about with substantial uniformity within the whole mass, no portion of the mass cooling and inclosing another and still soft portion. Segregation and crystallization do not occur while contraction is taken up by the whole mass. Any component tending to separate first is evenly incorporated in the whole mass and is given no opportunity to produce crystals of any size. Solidification of the whole mass takes place at the same time. The block or mass thus produced being of substantially the same hardness throughout, the crushing does not produce an abnormal amount of fines, as in the usual procedure where the force necessary to break the flinty outer portions of the mass crumbles down the softer inner portions. The carbid thus produced is substantially homogeneous throughout its mass and is not crystalline in texture, but fine-grained and of a texture somewhat like that of porcelain. And since it contains in homogeneous admixture all portions of the original mass of molten carbid, it averages somewhat richer in gas producing quality than the ordinary granulated carbid in which the hard, first cooled portions are more largely represented than the rest. There being no pronounced crystallization with concomitant well developed lines of cleavage, it breaks into a better type of granule and each of these granules, like the original block represents practically the average composition of the entire mass.

While the described method may be advantageously employed in the manufacture of other carbids tending to set into hard crystalline masses upon solidification it is particularly adapted for use in the manufacture of calcium carbid in which the need for homogeneity of product is very great. In the acetylene generator, particles of calcium carbid of different composition produce gas at different rates of speed, giving rise to the annoying and frequently dangerous "after generation" where the lump carbid contains granules of slow operating product. The present product being substantially homogeneous in the ingot, the granules produced are all alike and generate gas with the same speed.

What I claim is:—

1. In the manufacture of carbid, the process which comprises producing a fused liquid mass of such carbid and agitating the same while solidifying.

2. In the manufacture of calcium carbid, the process which comprises producing a fused liquid mass of such calcium carbid, and agitating the same while solidifying.

3. In the manufacture of carbid, the process which comprises producing a molten mass of carbid, partially cooling a separate portion of the mass and building up a block or ingot by successive additions to the portion first cooled.

4. In the manufacture of calcium carbid, the process which comprises producing a molten mass of calcium carbid, partially cooling a separate portion of the mass and building up a block or ingot by successive additions to the portion first cooled.

5. In the manufacture of carbid, the process which comprises producing molten carbid and gradually drawing off such molten carbid and accumulating it in the form of a block or ingot, the carbid being agitated while accumulating.

6. In the manufacture of calcium carbid, the process which comprises producing molten calcium carbid and gradually drawing off such molten calcium carbid and accumulating it in the form of a block or ingot, the carbid being agitated while accumulating.

7. In the manufacture of carbid, the process which comprises gradually tapping molten carbid into a suitable mold and agitating the molten mass therein pending the filling of the mold and solidification therein.

8. In the manufacture of calcium carbid, the process which comprises gradually tapping molten calcium carbid into a suitable mold and agitating the molten mass therein pending the filling of the mold and solidification therein.

9. In the manufacture of carbid, the process which comprises gradually tapping molten carbid into a suitable mold and allowing cooling to near the point of solidification to occur in the accumulating mass prior to completely filling the mold.

10. In the manufacture of calcium carbid, the process which comprises gradually tapping molten calcium carbid into a suitable mold and allowing cooling to near the point of solidification to occur in the accumulating mass prior to completely filling the mold.

11. In the manufacture of carbid, the process which comprises gradually tapping molten carbid into a suitable mold and allowing cooling to near the point of solidification to occur in the accumulating mass prior to completely filling the mold, the molten material being stirred during the cooling.

12. In the manufacture of calcium carbid, the process which comprises gradually tapping molten calcium carbid into a suitable mold and allowing cooling to near the point of solidification to occur in the accumulating mass prior to completely filling the mold, the molten calcium carbid being stirred during the cooling.

13. In the manufacture of calcium carbid, the process which comprises gradual introduction of hot molten calcium carbid into a mold, the addition being so conducted that a sufficient time elapses between the first addition and the last to produce a cooling of the accumulating mass to or near the point of solidification, the accumulating mass being agitated to prevent segregation and crystallization during such accumulation.

14. As a new article of manufacture, an ingot or block of calcium carbid substantially uniform in hardness throughout its mass.

15. As a new article of manufacture, an ingot or block of calcium carbid, substantially uniform in hardness and texture throughout its mass, such ingot or block being free of any substantial crystallization or segregation and being dense, hard and non-porous throughout.

In testimony whereof I have signed my name to this specification, in the presence of two subscribing witnesses, on this 21st day of February A. D. 1907.

HERMAN L. HARTENSTEIN.

Witnesses:
 FRANCIS A. HOPKINS,
 CHAS. H. SEEM.